United States Patent [19]

Ohta et al.

[11] Patent Number: 4,467,383
[45] Date of Patent: Aug. 21, 1984

[54] MAGNETOOPTIC MEMORY MEDIUM

[75] Inventors: Kenji Ohta, Yao; Toshihisa Deguchi; Akira Takahashi, both of Nara, all of Japan

[73] Assignee: Sharp Kabushiki Kaisha, Osaka, Japan

[21] Appl. No.: 237,083

[22] Filed: Feb. 23, 1981

[30] Foreign Application Priority Data

Feb. 23, 1980 [JP] Japan .................. 55-21910
Feb. 27, 1980 [JP] Japan .................. 55-25980
Apr. 9, 1980 [JP] Japan .................. 55-47362

[51] Int. Cl.$^3$ ............ G11B 13/04; G11C 13/06
[52] U.S. Cl. ........................... 360/131; 360/114;
 365/34; 365/113; 369/275
[58] Field of Search ............ 360/131, 114, 134, 135;
 428/900, 928, 644, 678, 694, 692, 232; 365/34,
 32, 113, 122; 75/122, 123 C; 369/275-276;
 148/31.55, 31.57

[56] References Cited

U.S. PATENT DOCUMENTS

| 3,676,867 | 7/1972 | Bacon et al. ............ 360/114 |
| 3,816,237 | 6/1974 | Barrall et al. ............ 360/131 |
| 3,878,367 | 4/1975 | Fayling et al. ............ 360/131 |
| 3,928,870 | 12/1975 | Ahrenkiel et al. ............ 360/114 |
| 3,949,387 | 4/1976 | Chaudhari et al. ............ 365/122 |
| 3,965,463 | 6/1976 | Chaudhari et al. ............ 365/29 |
| 4,042,341 | 8/1977 | Smeggil ............ 360/134 |
| 4,126,494 | 11/1978 | Imamura ............ 148/101 |
| 4,152,178 | 5/1979 | Malekzadeh et al. ............ 148/31.55 |
| 4,152,486 | 5/1979 | Imamura et al. ............ 75/123 E |
| 4,202,022 | 5/1980 | Imamura et al. ............ 360/114 |
| 4,228,473 | 10/1980 | Himuro et al. ............ 360/114 |
| 4,239,959 | 12/1980 | Gutterman ............ 360/2 |
| 4,271,232 | 6/1981 | Heiman et al. ............ 360/134 |

FOREIGN PATENT DOCUMENTS 2658956 6/1978 Fed. Rep. of Germany ...... 360/131
7713503 6/1979 Netherlands .

OTHER PUBLICATIONS

Gomi et al., A New Magnetic-Optic Readout Technique with High Speed and High Sensitivity, Sep. 1981, Japanese Journal of Applied Physics, pp. 821-824.
S. Matsushita et al., Jpn. J. Appl. Phys., 14, pp. 1851-1852, (1975).
Y. Mimura et al., Appl. Phys. Lett., 28, pp. 746-748, (1976).
Y. Mimura et al., Jpn. J. Appl. Phys., 15, pp. 937-938, (1976).

Primary Examiner—Stuart N. Hecker
Attorney, Agent, or Firm—Birch, Stewart, Kolasch & Birch

[57] ABSTRACT

Disclosed is a new magnetic storage medium including a layer of amorphous material typically GdDyFe whose Curie recording point (e.g. 120° C.) is lower than its crystallization point (e.g. 350° C.) to enable crystallization to cause variations in its optical properties such as transmittance or reflectivity for thermomagnetic writing. Reversible recordings are set up on the amorphous material layer by a thermomagnetic writing technique, for example Curie point writing, while unchangeable or permanent recordings are set up on the amorphous material layer through laser-activated crystallization of the amorphous material layer.

19 Claims, 5 Drawing Figures

MAGNETOOPTIC MEMORY MEDIUM

BACKGROUND OF THE INVENTION

This invention relates to a magnetooptic data storage medium of amorphous magnetic material and more particularly to a magnetooptic data storage medium including changeable and readable memory locations and unchangeable memory locations.

In recent years, the use of thin films of amorphous magnetic materials for thermomagnetic writing, erasing and megnetooptical reading has received particularly intensive study. This sort of optical memory system can be classified into the following categories, depending on data storage properties:

(1) it is readable only;
(2) it can hold additional recordings and is readable immediately after writing; and
(3) it is writable, readable and erasable.

Of these three different categories the last is most suitable for computer applications and typically comprises amorphous magnetic films as a storage medium.

Furthermore, the methods of writing for the magnetooptic storage medium developed to data are as follows: (a) a Curie point writing technique by which the temperature of a memory bit location is elevated above the Curie point where magnetizations are destroyed; (b) a compensation temperature technique which takes advantage of the coercivity falling when the memory bit location at about the compensation temperature is further heated; and (c) at temperature dependent coercivity technique relying upon the phenomemon where coercivity varies greatly with a temperature rise. Recording is achieved by applying a laser beam onto the memory bit location in the order of 1 um $\phi$ and thus varying magnetizations in light-activated domains due to temperature increases. Erasing recordings demands energy for restoring the original magnetizations, using the same optical system as for writing. This sort of amorphous magnetic material is well known as a changeable optical memory medium. Reversibility of the medium, however, results in erasing recordings upon malfunction or erroneous operation of a recording system and making data unstable due to fluctuations in the ambient temperature.

OBJECTS AND SUMMARY OF THE INVENTION

Accordingly, it is an object of the present invention to provide a magnetooptic recording medium which has a writable and erasable memory location for thermomagnetic writing, erasing and recording and magnetoptical reading and an unchangeable memory location for only magnetooptical recording.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
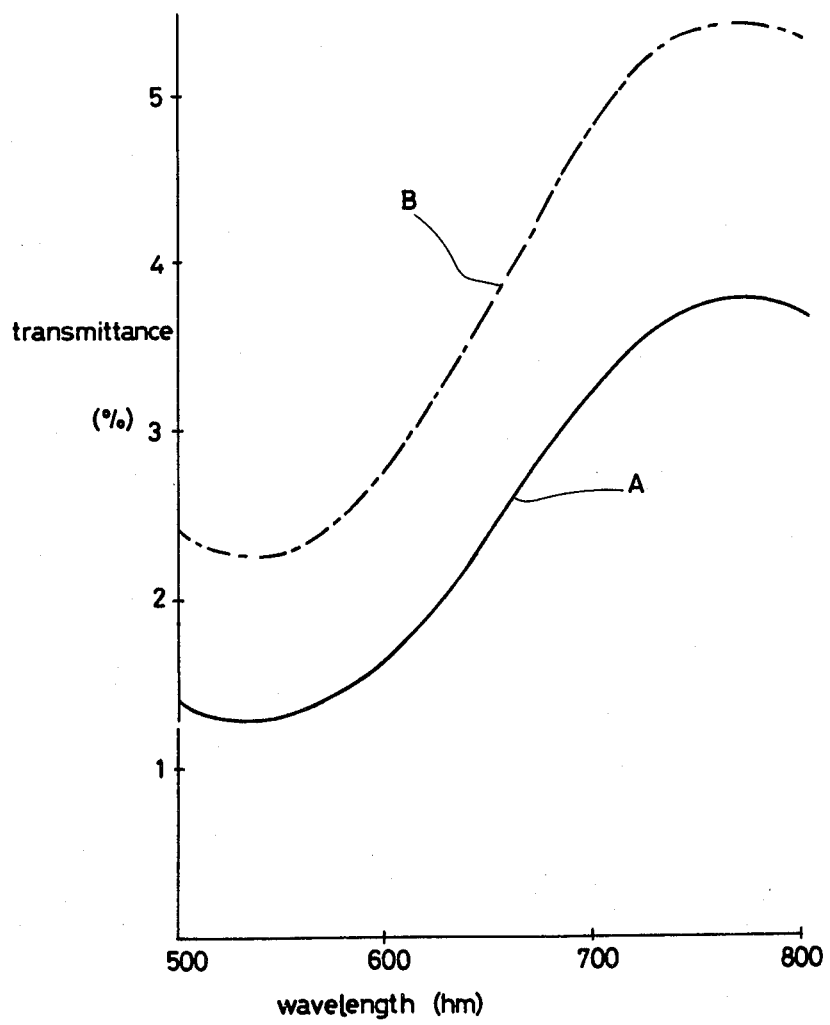
FIG. 1 is a graph plotting transmittance of a GdDyFe film in the amorphous state and crystallized state overcovered with a $SiO_2$ layer as a function of wavelength.
Figure 2:
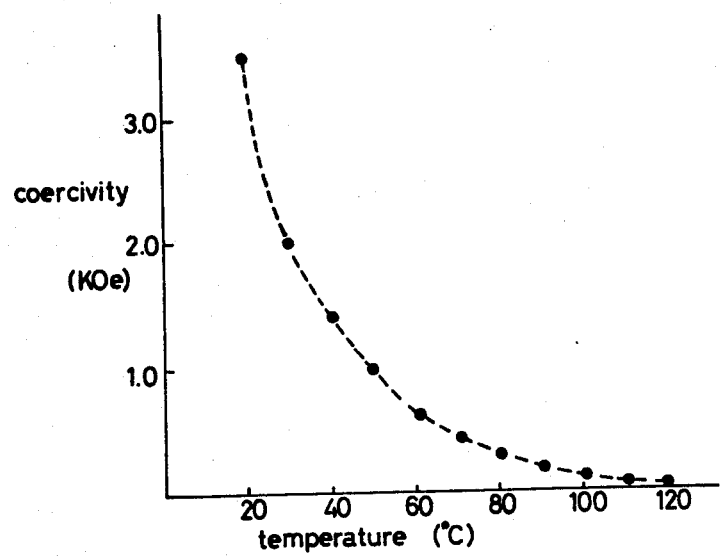
FIG. 2 is a graph showing the relation between coercivity and Curie point.

A film of amorphous magnetic material including rare earth metals and transition metals manifests an increase in transmittance and a decrease in reflectivity by crystallization, as is clear from FIG. 1 where the curve A shows the amorphous state of the film and the curve B shows the crystallized state. Of particular interest is GdDyFe which exhibits a remarkable trend to vary its transmittance or reflectivity depending whether it is in the amorphous state or the cyrstallized state. This leads to the possibility that crystallizing desired individual bit locations can provide brightness-varying signals in reading out the locations via a light detector and an optical reproduction system (using Faraday effect or the like) can be utilized as it is. It is obvious from FIG. 2 that the Curie point of the amorphous magnetic material GdDyFe is approximately 120° and the transmission point from the amorphous to the crystallized state is 350°. There is therefore a difference of temperature sufficient to enable both Curie point writing (as a changeable memory) and Crystallization writing (as an unchangeable or permanent memory) on the same medium by varying the intensity of a recording light source.

Figure 3:
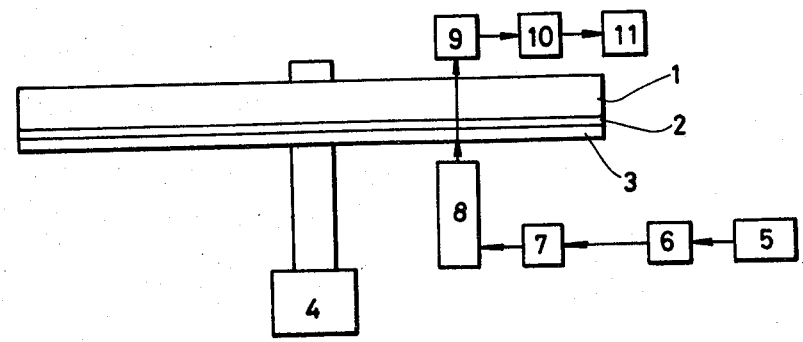
FIG. 3 is a schematic diagram of an optical data storage device using Faraday effect.

In other words, as seen from FIG. 3, a thin film 2 of amorphous GdDyFe (e.g., Gd:Tb:Fe ratio=0.24:0.18:1) and thickness=500–800 Å) whose Curie point recording is possible at a first temperature significantly lower than that of the second crystallization or transition temperature is deposited on a substate 1 of glass or transparent plastic. An example of the substrate 2 used is glass, acryl or polycarbonate. The GdDyFe thin film 1 is overcovered with a protective film 3 of $SiO_2$ (e.g., thickness=5400 Å), thus completing a magnetooptic recording medium. Then, the memory medium is shaped into a disk which is driven at an appropriate rate by a rotating driving system 4 such as a motor.

To record write and fetch read data on and from the above-mentioned storage medium, there is provided an optical memory system which relies upon Curie point writing using the magnetooptical Faraday effect of the thin film. In this drawing, a laser 5 typically of He-Ne is provided which releases a laser beam via a light modulator 6 and a polarizer 7 toward an optical system 8 including a mirror for changing the direction of its optical path and a recording lens. The optical system 8 is located vis-a-vis with memory bit locations of the storage medium to apply the laser beam thereto so that data may be written as the changeable recording or the unchangeable recording, based on the output level of the laser beam. Furthermore, the data fetched from the storage medium 1 is led to a detector 10 via an optical system 9 including a mirror for changing the optical path and a condensor lens and then to a light detector 11. This results in reading the data from the changeable memory locations and the unchangeable memory locations.

Although the foregoing has set forth the use of the GdDyFe film as a typical example of the amorphous magnetic material, other materials whose recording temperatures are lower than its crystallization points to enable crystallization to cause a difference in transmittance or reflectivity are available for the purpose of the present invention, for example, GdTbFe, DyFe, TbFe, etc. medium. Methods of writing and reading other than the above mentioned Curie point writing and Faraday effect reading are also useful as far as the present invention is concerned.

As noted earlier, the present invention utilizes the temperature dependency of the magnetization properties and crystallization properties of the amorphous magnetic material, thus making it possible to set up both the reversible recordings and unchangeable recordings on the same storage medium with different conditions of erasing information. More particularly, the permanent (unchangeable) recordings are made with no possible destruction of information. In addition, writing and reading require no particular expenditure.

Generally speaking, a high packing density storage medium has recording tracks each of a width in the order of 1 um. For writing and reading by the laser beam to be practical, it is essential that the laser beam be spotted on only a track sought to be written or read and not other tracks. To this end a precision optical system or a servo system with the help of guide tracks is necessary.

Figure 4:
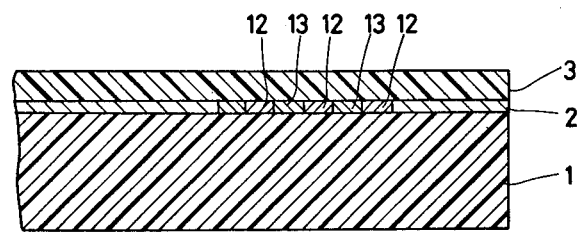
FIG. 4 is a storage medium with guide tracks according to the present invention.
Figure 5:
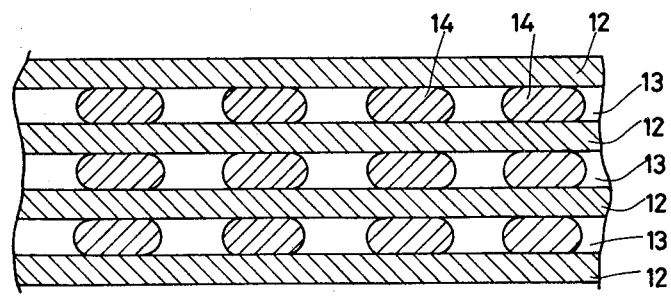
FIG. 5 is an enlarged view of the guide tracks in FIG. 4.

In another preferred aspect of the present invention, the unchangeable recordings are effectively utilized as guide tracks for the laser-addressing technique. FIGS. 4 and 5 illustrate a magnetooptic data storage medium with crystallized guide tracks. The guide tracks 12 are formed to be flush with recording (reversible) tracks 13 upon laser beam application. In order to form the guide tracks 12 as minute as possible, the laser beam of a short wavelength is employed, for example, Ar laser beam of about 4880 Å. Especially, both sides of a respective one of the recording tracks 13 are heated to above the crystallization temperature (typically, 350° C.) for the setup of the guide tracks 12.

In the case where the guide tracks 12 are set up along the recording tracks in this manner, the recording tracks 13 are never crystallized to ensure that the recordings are stable even during exposure of the laser beam for the setup of record bits 14 at a first temperature near the Curie point (about 100° C.). Furthermore, the other recording tracks 13 are not affected by exposure of the laser beam because of the recording tracks being sandwiched between the guide tracks 12.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A magnetic storage medium, comprising:
    a layer of magnetic material having changeable and readable amorphous magnetic memory locations and permanent crystalline memory locations.
2. The magnetic storage medium according to claim 1, wherein information can be stored at said changeable memory locations by exposure of said changeable memory locations to a temperature lower than the crystallization temperature thereof.
3. The magnetic storage medium according to claim 1, wherein information can be stored at said changeable memory locations by Curie point writing.
4. The magnetic storage medium according to claim 1, wherein said magnetic material includes a rare earth metal and a transition metal.
5. The magnetic storage medium according to claim 1, wherein said magnetic material is GdDyFe.
6. The magnetic storage medium according to claim 1, wherein said magnetic material is GdTbFe.
7. The magnetic storage medium according to claim 1, wherein said magnetic material is DyFe.
8. The magnetic storage medium according to claim 1, wherein said magnetic material is TbFe.
9. A magnetooptical storage medium, comprising:
    a layer of magnetic material having changeable optically readable amorphous magnetic memory locations and permanent optically readable crystalline memory locations.
10. The magnetooptical storage medium according to claim 9, wherein information can be stored at said changeable memory locations by Curie point writing.
11. The magnetooptical storage medium according to claim 9, wherein said layer of magnetic material includes a rare earth metal and a transition metal.
12. A magnetic storage medium, comprising:
    a layer of magnetic material having changeable amorphous recording tracks and permanent crystallized guide tracks formed therein.
13. A magnetooptical storage medium according to claim 12, wherein said permanent crystallized guide tracks and said changeable amorphous recording tracks can be optically read.
14. The magnetooptical storage device according to claim 13, wherein said amorphous recording tracks have changeable information stored therein by Curie point writing.
15. The magnetic storage medium according to claim 12, wherein said recording tracks are flanked with said guide tracks.
16. A magnetooptical storage medium according to claim 12, wherein said recording tracks are capable of storing information by Curie point writing.
17. A magnetooptical storage medium according to claim 12, wherein said magnetic material is a layer of GdDyFe.
18. A magnetooptical storage medium according to claim 12, wherein said layer is a layer of GdTbFe.
19. The magnetic storage medium according to claim 12, wherein said magnetic material includes a rare earth metal and a transition metal.

* * * * *